(12) United States Patent
Roeland et al.

(10) Patent No.: US 11,356,359 B2
(45) Date of Patent: Jun. 7, 2022

(54) METHODS AND NETWORK NODES FOR SCALABLE TOP-OF-CHAIN SELECTION IN MOBILE SERVICE CHAINING

(71) Applicant: TELEFONAKTIEBOLAGET LM ERICSSON (PUBL), Stockholm (SE)

(72) Inventors: Dinand Roeland, Sollentuna (SE); Zhang Fu, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 70 days.

(21) Appl. No.: 15/756,995

(22) PCT Filed: Sep. 1, 2016

(86) PCT No.: PCT/EP2016/070647
§ 371 (c)(1),
(2) Date: Mar. 2, 2018

(87) PCT Pub. No.: WO2017/037193
PCT Pub. Date: Mar. 9, 2017

(65) Prior Publication Data
US 2018/0262423 A1    Sep. 13, 2018

Related U.S. Application Data
(60) Provisional application No. 62/213,492, filed on Sep. 2, 2015.

(51) Int. Cl.
*H04L 45/30* (2022.01)
*H04L 47/20* (2022.01)
(Continued)

(52) U.S. Cl.
CPC ............ *H04L 45/306* (2013.01); *H04L 47/20* (2013.01); *H04L 47/24* (2013.01); *H04L 47/2441* (2013.01); *H04L 47/31* (2013.01)

(58) Field of Classification Search
CPC ....... H04L 45/306; H04L 47/20; H04L 47/24; H04L 47/2441; H04L 47/31
See application file for complete search history.

(56) References Cited

U.S. PATENT DOCUMENTS

| | | | |
|---|---|---|---|
| 7,031,275 B1 * | 4/2006 | Borella | H04L 29/12924 370/328 |
| 9,088,584 B2 * | 7/2015 | Feng | H04L 67/1031 |

(Continued)

FOREIGN PATENT DOCUMENTS

| | | |
|---|---|---|
| WO | 2015055945 A1 | 4/2015 |
| WO | 2015094296 A1 | 6/2015 |

OTHER PUBLICATIONS

International Search Report and Written Opinion issued in International Application No. PCT/EP2016/070647, dated Dec. 7, 2016, 11 pages.

(Continued)

*Primary Examiner* — Jeffrey M Rutkowski
*Assistant Examiner* — Jasper Kwoh
(74) *Attorney, Agent, or Firm* — Rothwell, Figg, Ernst & Manbeck, P.C.

(57) ABSTRACT

A method performed in a first network node includes the first network node receiving a downlink data packet intended for a user equipment (UE). The method further includes, in response to receiving the downlink data packet, the first network node retrieving, from a second network node, a list of a plurality of top of service function chain (SFC) nodes, each top of SFC node being a first node in a SFC that is in communication with the first network node. The method further includes, the first network node selecting at least one top of SFC node from the plurality of top of SFC nodes in accordance with predetermined criteria. The method further includes the first network node marking the downlink data (Continued)

packet such that the marked downlink data packet is forwarded to the selected top of SFC node.

12 Claims, 11 Drawing Sheets

(51) Int. Cl.
*H04L 47/31* (2022.01)
*H04L 47/24* (2022.01)
*H04L 47/2441* (2022.01)
*H04L 45/302* (2022.01)

(56) References Cited

U.S. PATENT DOCUMENTS

| | | | |
|---|---|---|---|
| 9,462,084 B2* | 10/2016 | Connor | G06F 9/45558 |
| 9,979,645 B2* | 5/2018 | Li | H04L 45/745 |
| 10,084,706 B2* | 9/2018 | Meng | H04L 12/6418 |
| 2009/0019054 A1* | 1/2009 | Mace | H04L 67/1097 |
| 2010/0189103 A1* | 7/2010 | Bachmann | H04W 28/06 |
| | | | 370/389 |
| 2015/0017994 A1* | 1/2015 | Salami | H04W 16/20 |
| | | | 455/446 |
| 2015/0195197 A1 | 7/2015 | Yong et al. | |
| 2015/0215172 A1* | 7/2015 | Kumar | H04L 41/5041 |
| | | | 709/223 |
| 2015/0295833 A1* | 10/2015 | Mizukoshi | H04L 47/125 |
| | | | 370/235 |
| 2015/0319078 A1* | 11/2015 | Lee | H04L 12/6418 |
| | | | 370/392 |
| 2015/0334094 A1* | 11/2015 | Suresh | H04L 63/0471 |
| | | | 713/153 |
| 2016/0112337 A1* | 4/2016 | Zhang | H04L 47/35 |
| | | | 370/237 |
| 2016/0164776 A1* | 6/2016 | Biancaniello | H04L 45/306 |
| 2016/0205005 A1* | 7/2016 | Lee | H04L 41/5025 |
| | | | 709/224 |
| 2017/0012865 A1* | 1/2017 | Nainar | H04L 47/2483 |
| 2017/0019335 A1* | 1/2017 | Schultz | H04L 43/0876 |
| 2017/0099194 A1* | 4/2017 | Wei | H04L 41/5041 |
| 2017/0346704 A1* | 11/2017 | Strijkers | G06F 9/5005 |
| 2018/0077247 A1* | 3/2018 | Wang | H04W 72/04 |
| 2018/0227221 A1* | 8/2018 | Starsinic | H04W 4/70 |

OTHER PUBLICATIONS

Halpern, J. et al., "Service Function Chaining (SFC) Architecture; rfc7665.txt", Internet Engineering Task Force, IETF; Standard Internet Society (ISOC), Oct. 2015, 31 pages.

\* cited by examiner

METHODS AND NETWORK NODES FOR SCALABLE TOP-OF-CHAIN SELECTION IN MOBILE SERVICE CHAINING

CROSS REFERENCE TO RELATED APPLICATION(S)

This application is a 35 U.S.C. § 371 National Stage of International Patent Application No. PCT/EP2016/070647, filed Sep. 1, 2016, designating the United States and claiming priority to U.S. provisional application No. 62/213,492, filed on Sep. 2, 2015. The above identified applications are incorporated by reference.

TECHNICAL FIELD

This disclosure relates generally to mobile service chaining, and more particularly, to methods and network nodes for scalable top-of-chain selection in mobile service chaining.

BACKGROUND

Figure 1:
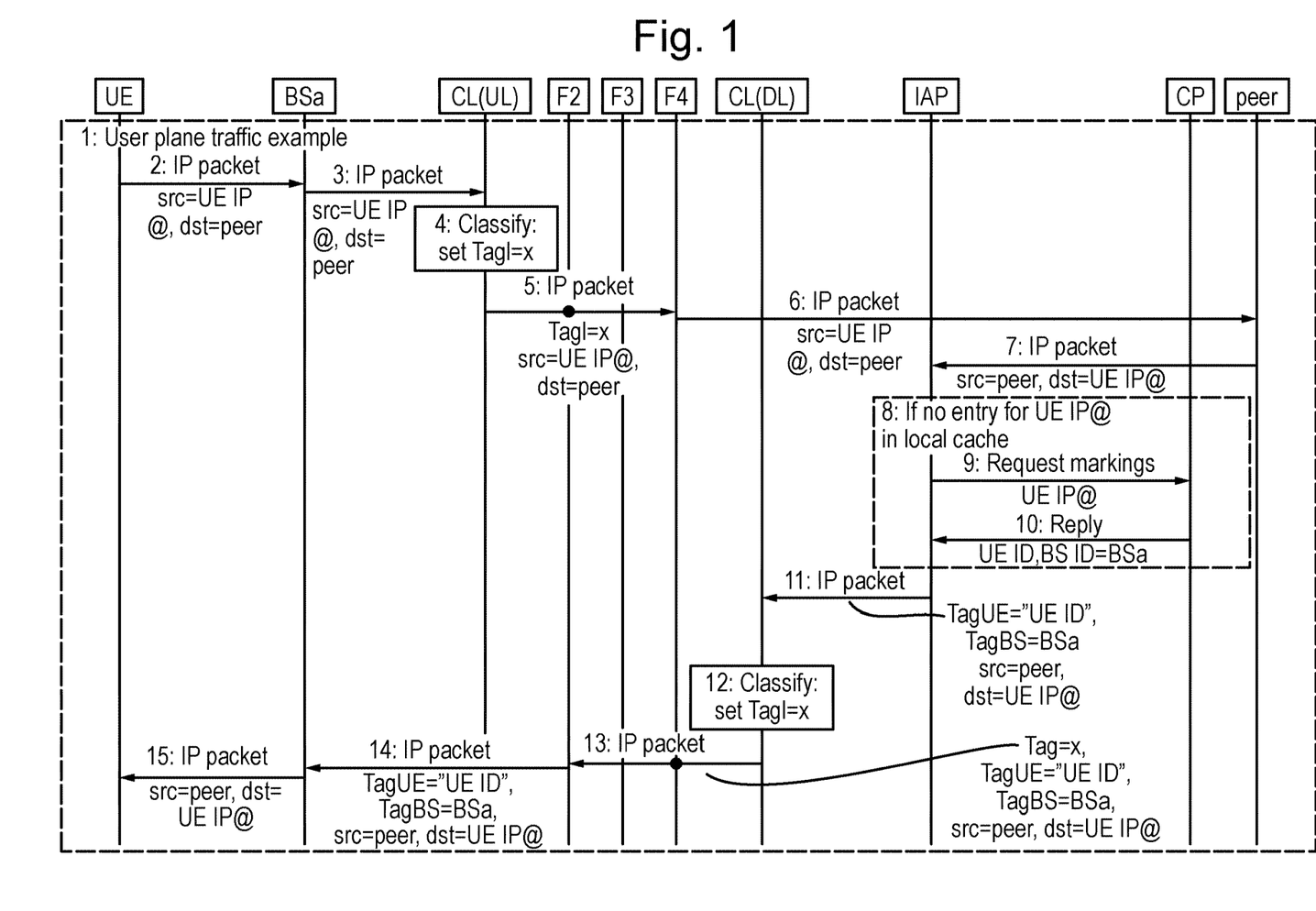
FIG. 1 is an illustration of signal flow diagram.

FIG. 1 illustrates a packet exchange between a device (UE) and a peer. When an Internet Protocol Advertisement Point (IAP) has received a downlink packet (step 7), the IAP needs to find the current location of the UE in location registry (LR). The LR is logically a single entity but may be implemented in a distributed way. Each IAP may have a cache with a local LR. If the UE IP address is not found in the local cache of that IAP, then the IAP may perform a query to the global LR (step 9). It is assumed here that the global LR is contained within the control plane (CP).

Figure 2:
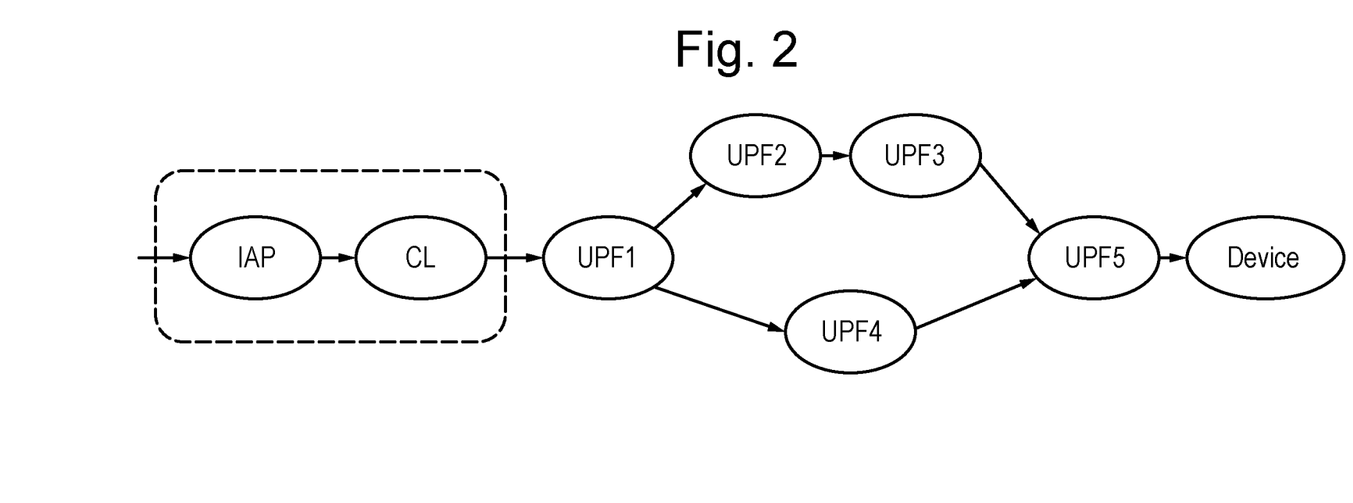
FIG. 2 is an illustration of a mobile service chain.

Conventionally, the IAP sends downlink packets to a classifier (CL). A CL is a user plane function (UPF) node that classifies the packet. The CL then may add one or more tags to the packets, which in its turn are used by the FEs in order to take forwarding decisions. FIG. 2 illustrates an example of how such a chain may look like. After classification, there may be a common function (i.e., UPF1), and after this the chain is split. Each packet either traverses UPF2 and UPF3 or it traverses UPF4. After this, all packets traverse UPF5 before reaching the end device.

In a straightforward implementation, each IAP may send all packets to one CL. This CL could then even be co-located with the IAP in the same box as indicated by the dashed line in FIG. 2. However, this approach leads to a scalability issue. The CL may need to be configured with device-specific rules. That is, in FIG. 2 a device-specific rule determines if a packet for that device shall traverse the UPF2-3 chain segment or the UPF4 chain segment. If the IAP simply sends to one CL, then that CL needs to keep rules for all devices of which packets may end up at the IAP. In other words, the number of rules in the CL is in the same magnitude as the address range announced by the IAP. This number of rules may be too high for the CL, in particular if the IAP announces the complete address range for this operator. Allowing each IAP to send to multiple CLs given a plain round-robin load balancing policy does not solve the scalability issue. The number of classification rules per individual CL will not decrease.

Figure 3:
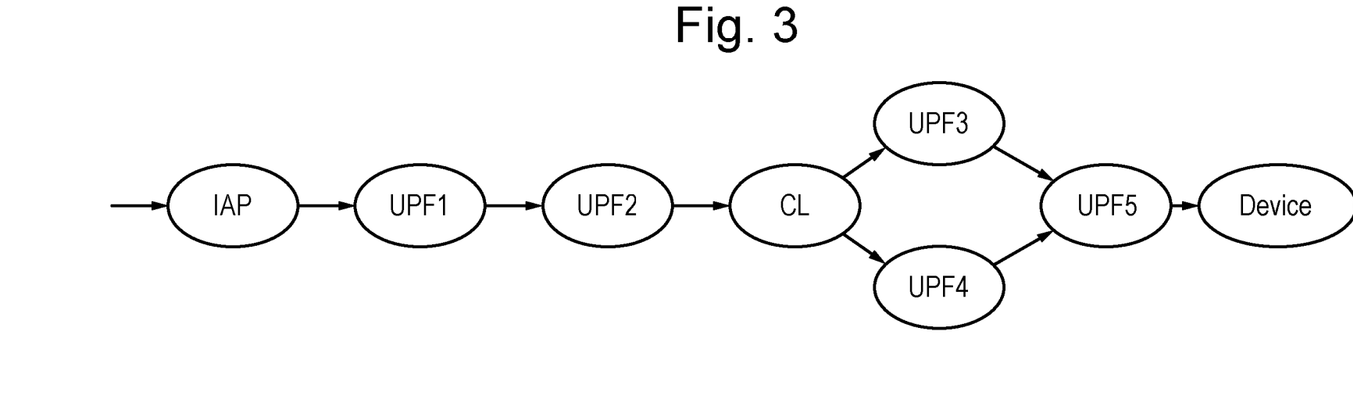
FIG. 3 is an illustration of a mobile service chain.

Another problem with the approach above is that the first UPF in the chain does not always need to be a CL. For example, a number of other UPFs (e.g. an intrusion detection system, a firewall or a NAT) may need to be traversed before a classification is made. FIG. 3 illustrates an example of this type of chain. The same scalability problem as mentioned before also applies to the chain illustrated in FIG. 3. Furthermore, UPF1 or UPF2 may need to have some device-specific state. For example, if one of these UPFs is a NAT, it will need to hold port bindings. This implies that other IAPs will need to send their packets to the same instance of that UPF. The scalability problem then becomes unmanageable.

SUMMARY

According to some embodiments, a method performed in a first network node includes the first network node receiving a downlink data packet intended for a user equipment (UE). The method further includes, in response to receiving the downlink data packet, the first network node retrieving, from a second network node, a list of a plurality of top of service function chain (SFC) nodes, each top of SFC node being a first node in a SFC that is in communication with the first network node. The method further includes, the first network node selecting at least one top of SFC node from the plurality of top of SFC nodes in accordance with predetermined criteria. The method further includes the first network node marking the downlink data packet such that the marked downlink data packet is forwarded to the selected top of SFC node.

In some embodiments, a method performed in a first network node includes the first network node receives a network attachment request associated with a UE. The method further includes the first network node storing, in a location registry associated with the UE, a list of a plurality of top of service function chain (SFC) nodes, each top of SFC node being a first node in a SFC that is in communication with a second network node. The method further includes the first network node forwarding, in response to receiving a request from the second network node, the list of the plurality of top of SFC nodes to the second network node. The second network node selects at least one top of SFC node from the plurality of top of SFC nodes in accordance with predetermined criteria.

According to some embodiments, a first network node comprises a processor, and a computer readable medium coupled to the processor with the computer readable medium containing instructions executable by the processor. The first network node is operative to receive a downlink data packet intended for a user equipment (UE). The first network node is further operative to, in response to receiving the downlink data packet, retrieve, from a second network node, a list of a plurality of top of service function chain (SFC) nodes, each top of SFC node being a first node in a SFC that is in communication with the first network node. The first network node is further operative to select at least one top of SFC node from the plurality of top of SFC nodes in accordance with predetermined criteria. The first network node is further operative to mark the downlink data packet such that the marked downlink data packet is forwarded to the selected top of SFC node.

In some embodiments, a first network node comprises a processor, and a computer readable medium coupled to the processor with the computer readable medium containing instructions executable by the processor. The first network node is operative to receive a network attachment request associated with a UE.

The first network node is further operative to store, in a location registry associated with the UE, a list of a plurality of top of service function chain (SFC) nodes, each top of SFC node being a first node in a SFC that is in communication with a second network node. The first network nodes is further operative to forward, in response to receiving a request from the second network node, the list of the plurality of top of SFC nodes to the second network node. The second network node selects at least one top of SFC node from the plurality of top of SFC nodes in accordance with predetermined criteria.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

According to some embodiments, an IAP optimally selects the "top-of-the-chain" (i.e. the first UPF in the chain). An optimal selection includes, for example, that: (i) not every CL should need to keep rules for every device; (ii) it should be possible for an IAP to load balance amongst multiple CLs; (iii) the first UPF in the chain does not necessarily need to be a CL; (iv) it should be possible to select the first UPF on a per-device basis.

In some embodiments, the "top-of-the-chain" is stored in the LR entries to achieve scalability on a per-device granularity. Each LR entry, (i.e., each IP address), can be associated with one or more top-of-the-chain elements, which achieves load balancing, even on a per-device granularity.

Figure 4:
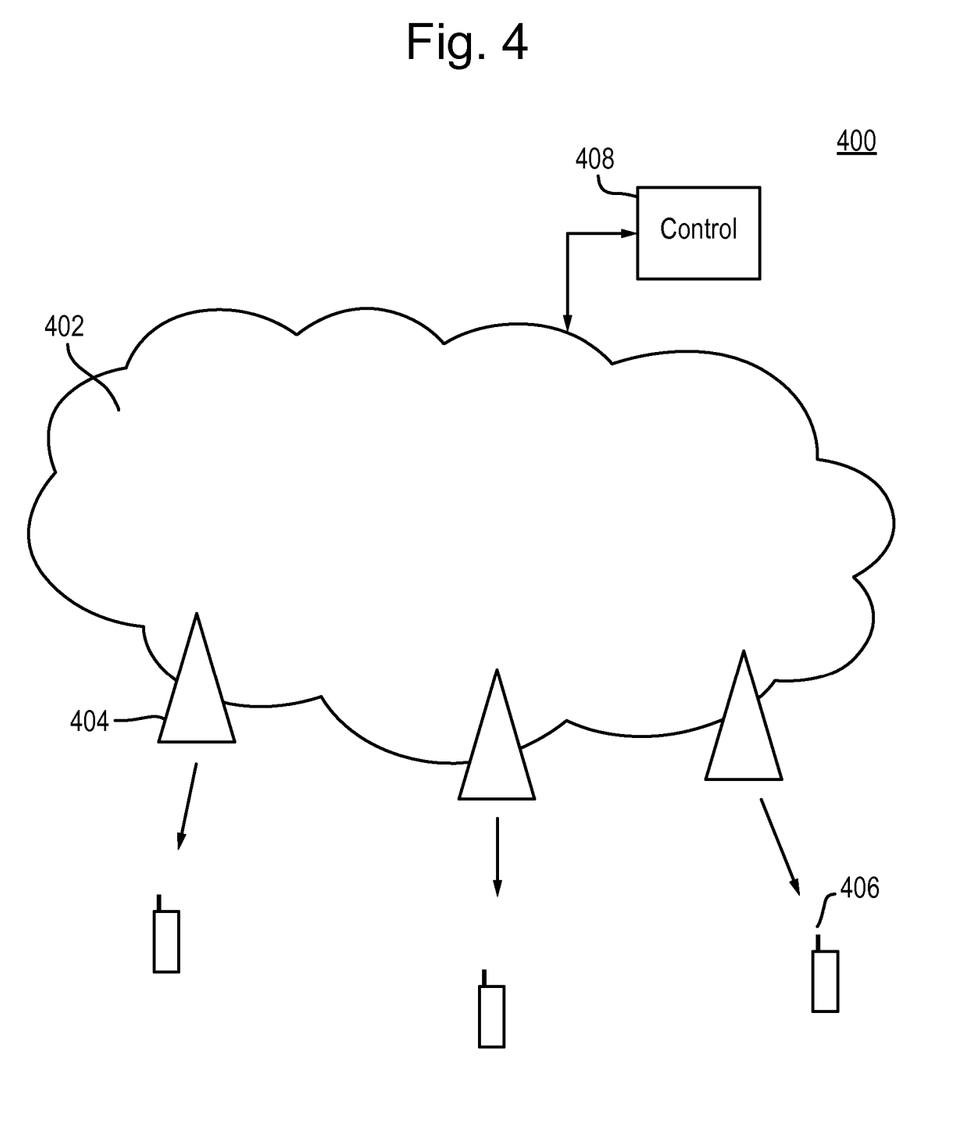
FIG. 4 is an illustration of a wireless communication system in accordance with exemplary embodiments.

Referring to FIG. 4, a wireless communication deployment 400 in accordance with exemplary embodiments includes an access node 404 serving a wireless communication device (WCD) 406. Examples of WCDs include, but are not limited to, mobile telephones, user equipments (UEs), personal digital assistants, electronic readers, portable electronic tablets, wireless sensors, machine communication devices, personal computers, and laptop computers.

Furthermore, the device 406 may be a legacy UE. Access node 404 may be, for example, a base station, an eNodeB, a WLAN Access Point, relay node, or gateway type device, and is capable of communicating with device 406, along with any additional elements suitable to support wireless communication between wireless communication devices or between a wireless communication device and another communication device, such as landline telephone. The access node 404 may be in communication with, for instance via a network 402, one or more control nodes 408, such as a Radio Network Controller (RNC), a Mobility Management Entity (MME), a Mobile Switching Center (MSC), a WLAN Access Gateway, or Base Station Subsystem (BSS). Although node 408 is explicitly identified as a control node, each of nodes 404, 406, and 408 may be understood as a "control" node to the extent that it includes a control unit or otherwise implements control functions.

In some embodiments, the wireless communication deployment 400 is WLAN and the access node 404 is a WLAN Access Point (AP). In some embodiments, the WLAN AP may not directly communicate with the control node 408 (e.g., the AP may not be aware of the control node). In this scenario, the UE communicates with the control node 408 over the WLAN AP.

Figure 5:
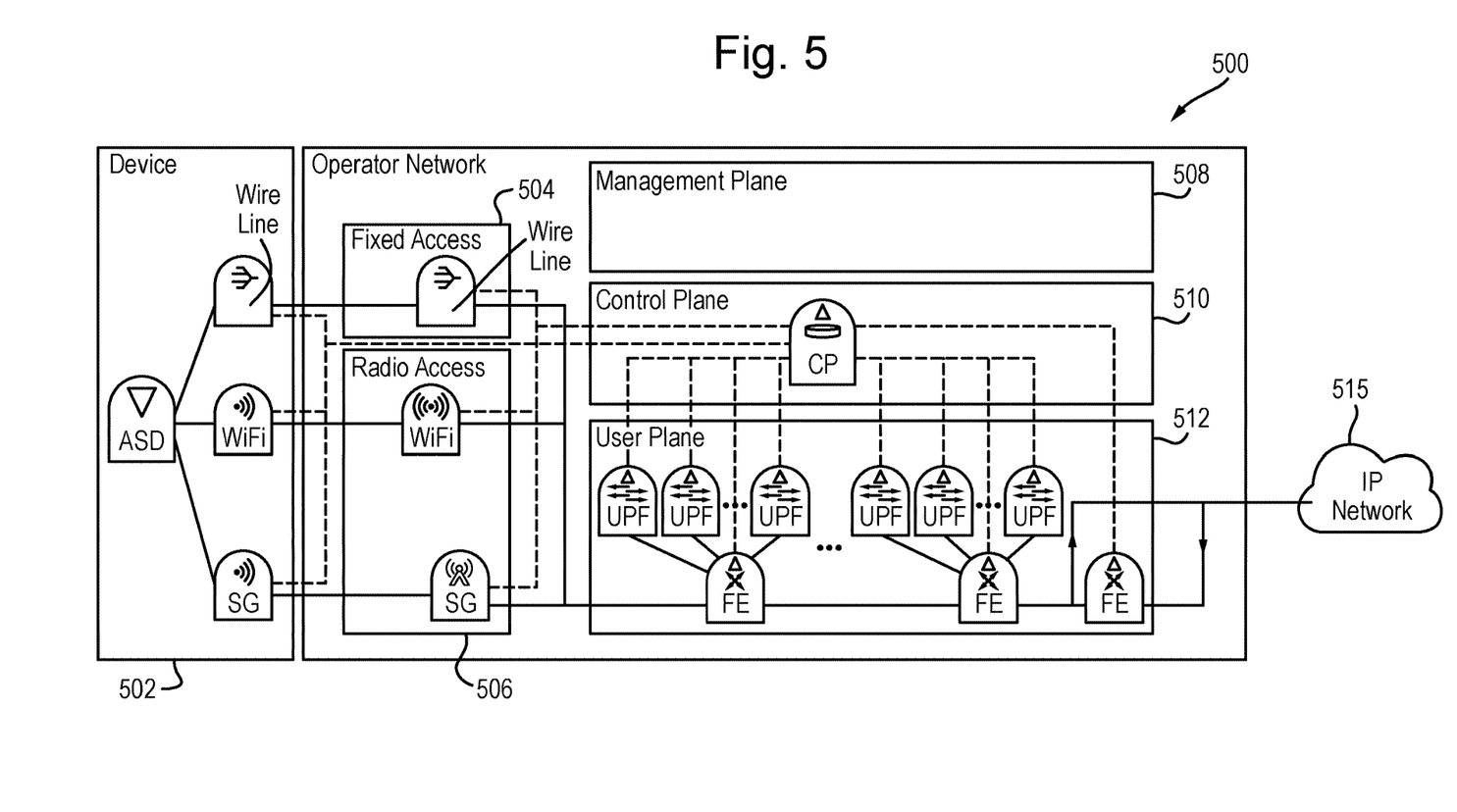
FIG. 5 illustrates a network topology in accordance with exemplary embodiments.

FIG. 5 illustrates an embodiment of a network architecture that has a device 502 accessing an operator network via a fixed access (e.g., wired) 504 or radio access 506. In some embodiments, the network architecture is divided into a management plane 508, a control plane 510, and user plane 512.

In some embodiments, the control plane 510 (CP) contains all control plane logic, allowing for a strict separation between control and user plane. It contains, amongst others, mobility handling as EPC's Mobility Management Entity (MME). In FIG. 5, the CP is depicted as a single logical element, however, the CP may be distributed among various elements or network entities.

According to some embodiments, the user plane 512 contains three types of function nodes: Forwarding Element (FE), UPF, and IAP. The FE may forward each packet to one of its ports based on rules it has received from the CP. An FE may forward a packet through one or more UPFs. An FE is may only be concerned with the actual forwarding and not with classification or modification of a packet.

In some embodiments, a UPF processes user plane packets. Processing may include altering the packet's payload and/or packet header. A UPF may serve multiple users, and may keep context per user. A UPF handles a collection of flows. The flows can be configured by the CP depending on the use case. Examples of flows include, but are not limited to: packets with the same IP 5-tuple, all packets to/from a specific BS.

In some embodiments, an IAP advertises a range of IP addresses/prefixes towards an outer IP network 515, which may be Internet or an operator-internal network. A single IP address/prefix may be advertised by multiple IAPs. If the IP address of a specific device is advertised by multiple IAPs, then packets for that device can enter the network via any of those IAPs. Furthermore, an anchored approach can be achieved by allowing only a single IAP to advertise the IP address for that device. The CP contains a Location Registry (LR). LR may be a table of entries, where each entry is a mapping from device IP address/prefix to an optional device identifier (ID) and current device location.

According to some embodiments, FEs forward packets to different UPFs and BSs according to which service chain the packets need to traverse and where the corresponding devices are located. This information may be added to the packet as tags by the IAP and/or classifiers.

In some embodiments, a classifier (CL) is a UPF that determines which service chain a packet takes based on the packet header and rules it has received from the CP. A CL may change the packet's header, (e.g., adding a tag to indicate which service chain the packet traverses). A CL may contact the CP when a packet cannot be classified, or it may drop such packet.

Figure 6:
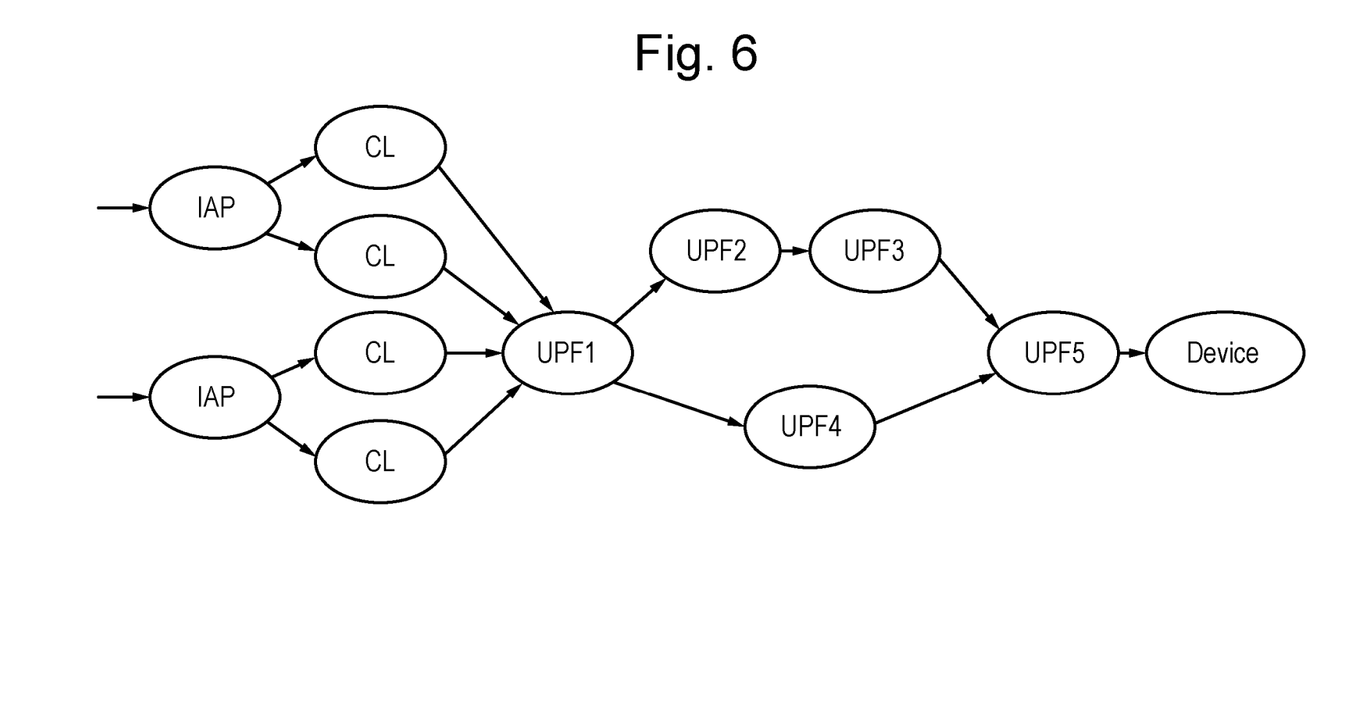
FIG. 6 illustrates an example mobiles service chain.

According to some embodiments, multiple top-of-chain UPFs are stored per LR entries enables load balancing on a per-device basis. FIG. 6 illustrates a top-of-the-chain that includes four UPFs (e.g., four instances of the same CL). The two IAPs may be placed in different sites. Each IAP may be configured with a rule such as "pick the top closest to you" and "if multiple are closest, apply round-robin."

Figure 7:
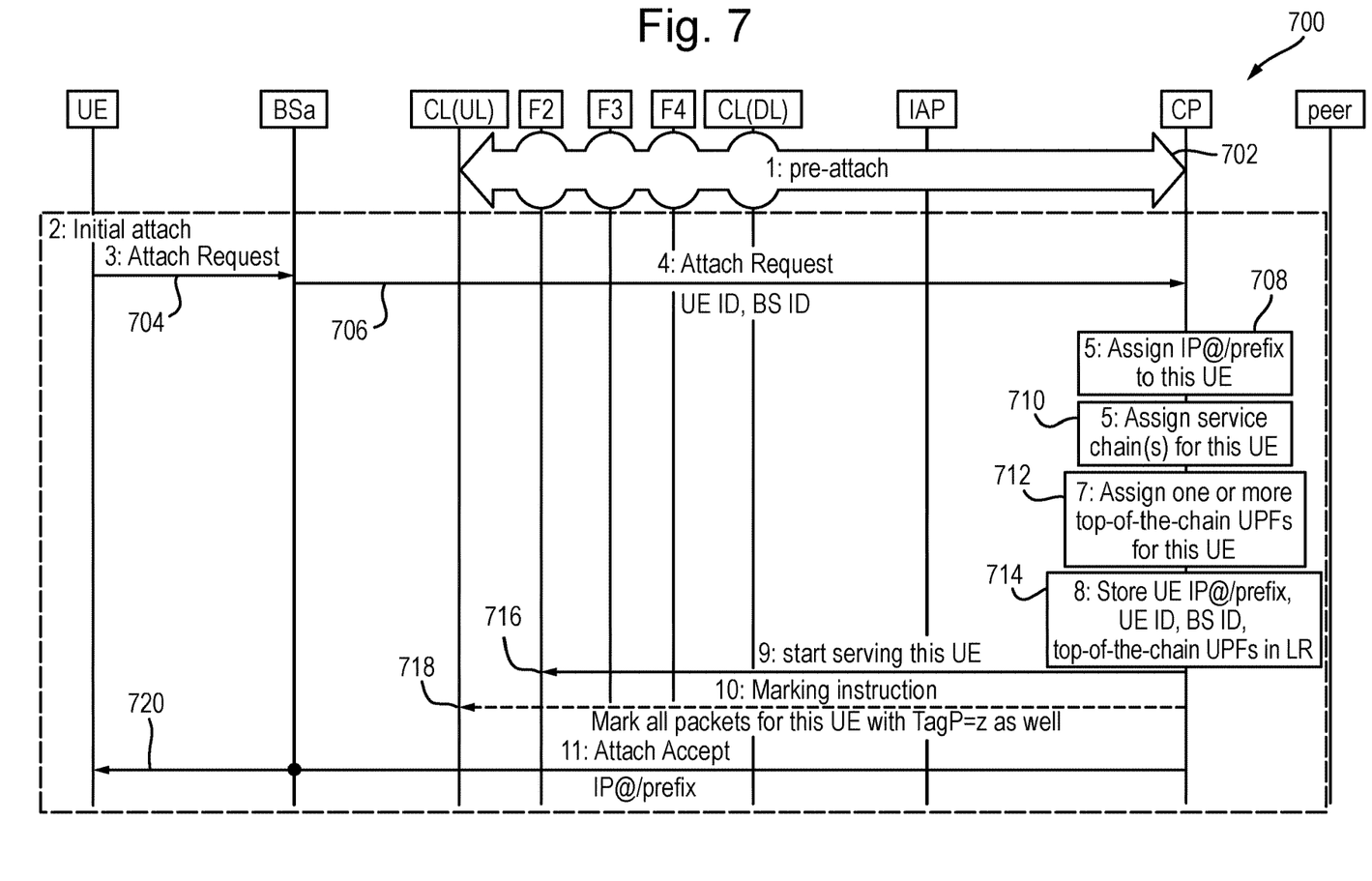
FIG. 7 illustrates a signal flow diagram in accordance with exemplary embodiments.

FIG. 7 illustrates an embodiment of a signal flow 700 when the UE attached to the network.

Step 702. Pre-attach is performed between uplink and downlink CLs and service functions F2, F3, and F4 with the CP. At pre-attach, the CP may pre-configure UPFs and Fes (e.g., FE rules that apply to multiple UEs may be installed in this step).

Step 704. The UE send an attach request to the base station.

Step 706. The base station forwards the attach request to the CP.

Step 708. The CP assigns an IP prefix to the UE.

Step 710. The CP assigns service chains for the UE.

Step 712. In some embodiments, when the device attaches, the CP assigns one or more "top-of-the-chain" UPFs for that device. As an example, the "top" is seen in the downlink direction. In FIG. 7, this would be a single instance of a classifier UPF marked as CL (DL). However, the CP could also have assigned a number of UPFs (e.g., a number of DL CLs for load balancing purposes). The CP stores the list of "top-of-the-chain" UPFs in the entry of the LR. The entries may be on a per-address (or per-prefix in IPv6) basis so that every entry can have a different list of top UPFs.

Step 716. The CP sends a message to the service function F2 to start serving the UE. This message may or may not be transmitted depending on the type of UPF selected. For example, if the UPF does bandwidth limiting, then in step 716, the CP would inform the UPF what bandwidth limit to apply for this particular UE. Step 718. The CP sends a marking instruction to the CL (UL). This step is optional and may not be needed in all cases.

Step 720. The CP sends an attach accept message to the UE.

Figure 8:
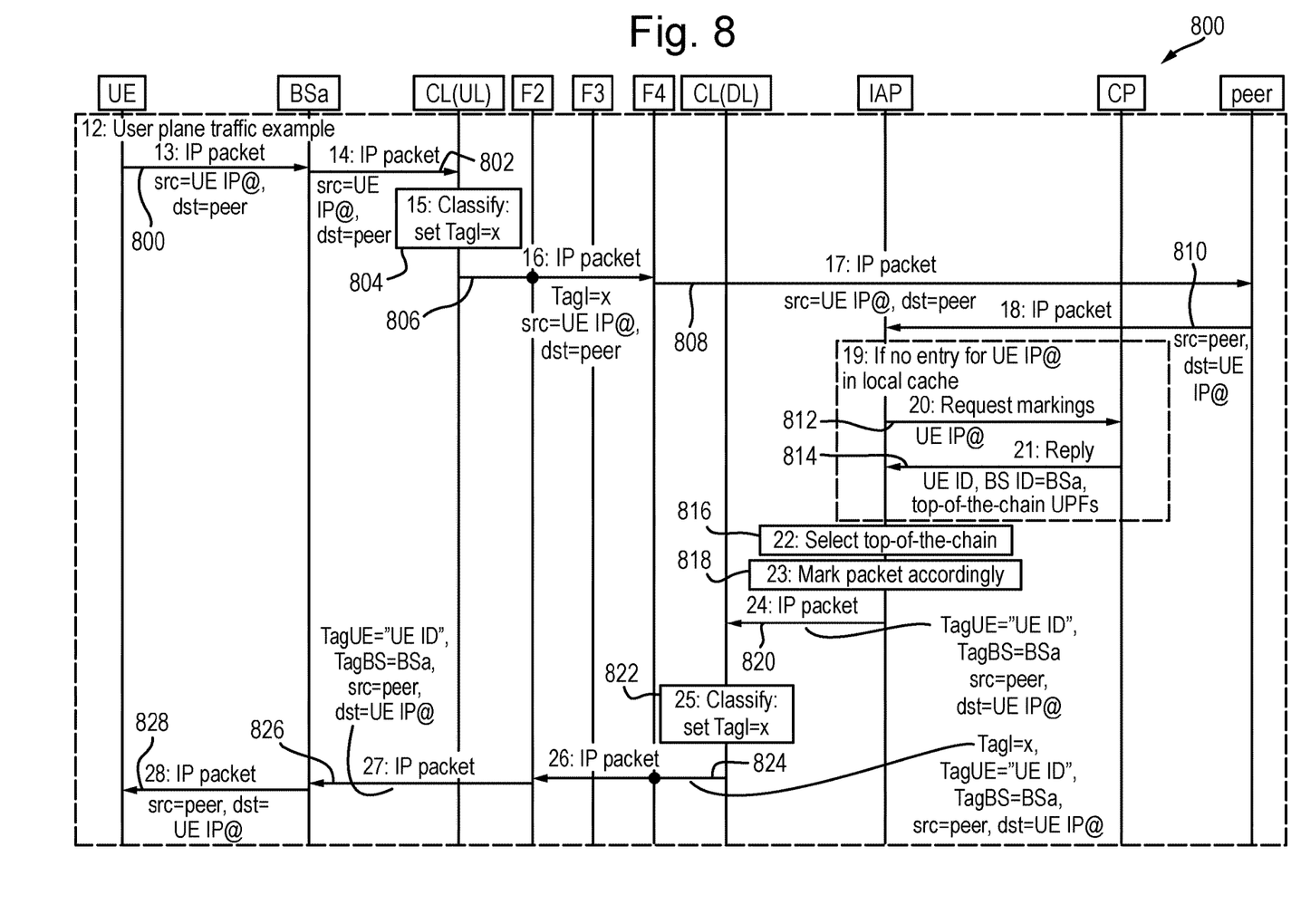
FIG. 8 illustrates a signal flow diagram in accordance with exemplary embodiments.

FIG. 8 illustrates an embodiment of a signal flow for selecting a top-of-the chain UPF.

Step 800. The UE transmits an IP packet to the base station.

Step 802. The base station forwards the IP packet to the CL (UL).

Step 804. The CL (UL) classifies the IP packet and marks the IP packet with a tag.

Step 806. The IP packet is forwarded to a service function chain (e.g., F2, F3, F4) according to the tag.

Step 808. The IP packet is forwarded to the destination (e.g., peer device) after completing the service function chain.

Step 810. The peer device transmits a packet intended for the UE to the IAP.

Step 812. The IAP transmits a request for markings to the CP.

Step 814. The CP sends a reply to the IAP. The reply may include a list of top-of-chain UPFs. According to some embodiments, the CP stores this list in the LR. When the user is provisioned to the system, there may be, for example, a user profile that indicates the service this user should get. As part of the service description, there may be a chain defined. When the UE later attaches to the system, the CP allocates UPF instances for the UE. At that point, the CP may store the list in the LR (step 712). The content of the list may depend on static information (e.g. the network topology) or network dimensioning information (e.g., mobile broadband users are served by specific resources), etc.

Step 816. The IAP selects a top-of-chain UPF. In some embodiments, given the list, the IAP now selects one top-of-the-chain UPF for this particular packet. Selection may be based on a policy that is pre-configured in the IAP or that was received previously from the CP. Examples of such policies include, but are not limited to: "use a round-robin scheduling", or "pick a UPF based on a hash" (where the hash could e.g. be done on one or more fields of the packed such as the source address, destination address, port number, etc.), or "pick the UPF that is closest to the IAP", or "pick the UPF that currently experiences least load", etc. The CP may be aware of which UPF the IAP is allowed to choose, which enables the CP to prepare the top-of-the-chain UPFs for that device. For example, if these UPFs act as a CL, the CP may need to send device-specific classification rules to these UPFs as part of the attach phase.

Step 818. The IAP now marks the packet such that it is forwarded to the UPF selected in the previous step. If forwarding is performed by FEs, then a tag is set that indicates the (instance of) CL (DL) in the example above. If such tag-based forwarding is implemented using, for example, the IETF's SFC architecture, then a specific Service Path Identifier is set in the SFC encapsulation header, where the Service Path Identifier indicates the CL (DL). Other means of forwarding to the top UPF are also possible as known to one of ordinary skill in the art. Step 820. The IAP forwards the IP packet to the CL (DL), which is the selected top-of-chain UPF selected in this example.

Step 822. The CL (DL) classifies and marks the IP packet with one or more tags.

Step 824. The CL (DL) forwards the IP packet to a service function chain in accordance with the one or more tags.

Step 826. After completing the service function chain, the IP packet is forwarded to the base station.

Step 828. The base station forwards the IP packet to the UE.

Figure 9:
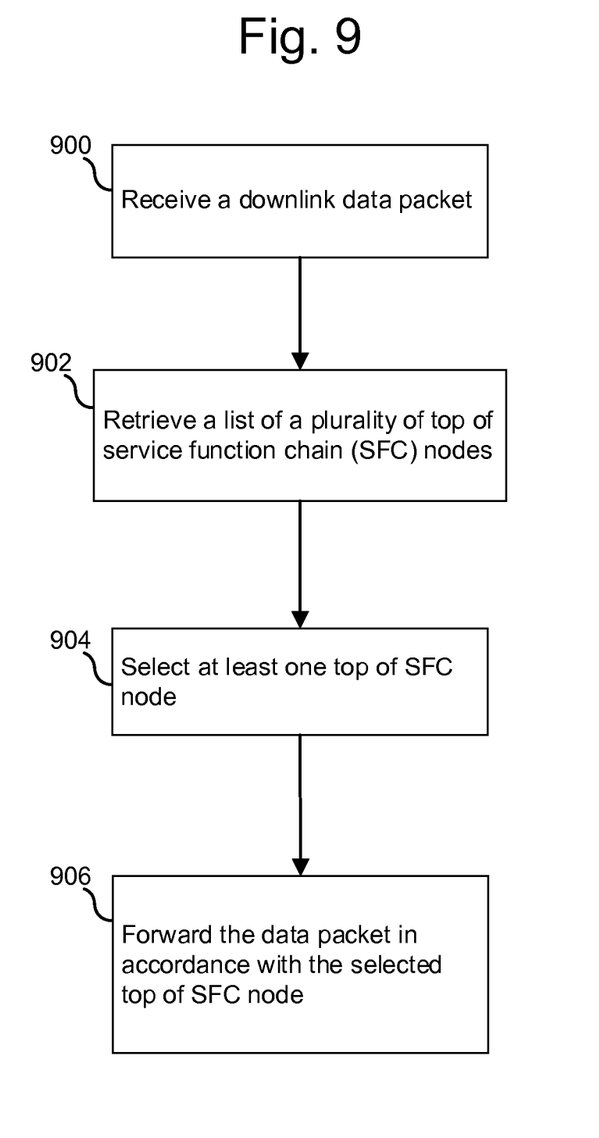
FIG. 9 illustrates a flow chart in accordance with exemplary embodiments.

FIG. 9 illustrates an embodiment of a process performed by a first network node such as the IAP. The process may start at step 900 where the first network node receives a downlink data packet intended for a user equipment (UE). In step 902, in response to receiving the downlink data packet, the first network node retrieves, from a second network node, a list of a plurality of top of service function chain (SFC) nodes, where each top of SFC node is a first node in a SFC that is in communication with the first network node. In step 904, the first network node selects at least one top of SFC node from the plurality of top of SFC nodes in accordance with predetermined criteria. In step 906, the first network node marks the downlink data packet such that the marked downlink data packet is forwarded to the selected top of SFC node.

In some embodiments, the predetermined criteria specifies selecting a top of SFC node that has the smallest traffic load. In some embodiments, the predetermined criteria specifies selecting a top of SFC node in accordance with a round-robin scheduling procedure. In some embodiments, the predetermined criteria specifies selecting a top of SFC node by applying a hash function on information included in the received downlink data packet. In some embodiments, the hash function is applied to one or more fields included in the header of the received downlink data packet. In some embodiments, the predetermined criteria specifies selecting a top of SFC node that is nearest to the first network node. In some embodiments, the first network node is an Internet Advertisement Point (IAP) node, and the second node is a control plane (CP) node. In some embodiments, the predetermined criteria is received from the second node. In some embodiments, the selected top of SFC node is a user plane function (UPF) node. In some embodiments, the selected top of SFC node is a classifier (CL) node. In some embodiments, the first network node forwards the marked downlink data packet to a forwarding element (FE) that forwards the marked data packet to the selected top of SFC node. In some embodiments, the first network node forwards the marked downlink data packet to an Internet Engineering Task Force (IETF) service function forwarder (SFF) that forwards the marked data packet to the selected top of SFC node.

Figure 10:
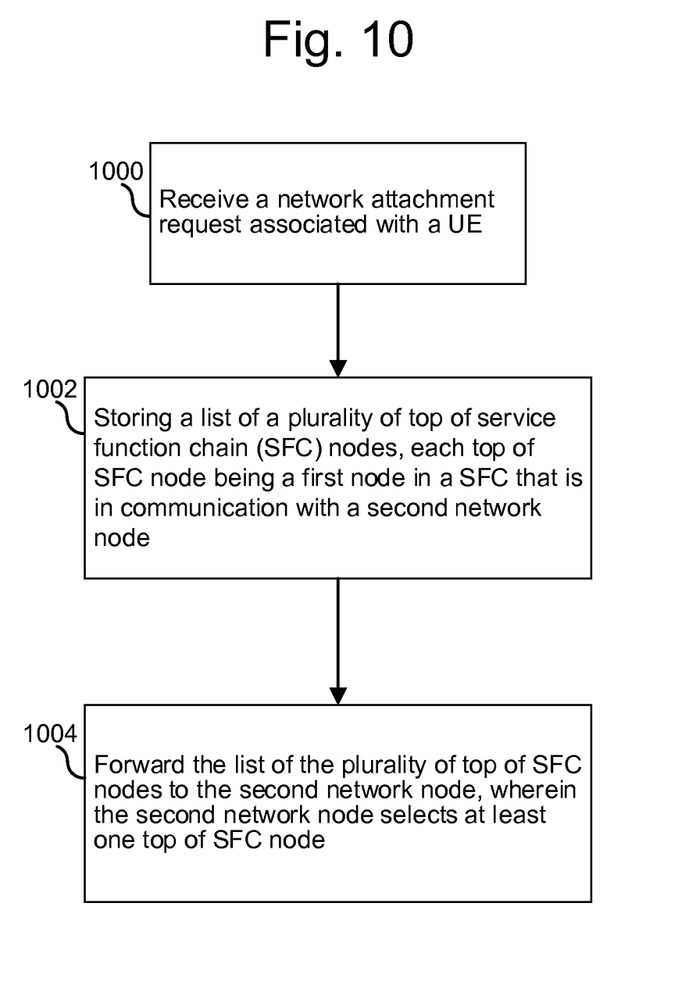
FIG. 10 illustrates a flow chart in accordance with exemplary embodiments.

FIG. 10 illustrates an embodiment of a process performed by a first network node such as a CP node. The process may start at step 1000 where the first network node receives a network attachment request associated with a UE. In step 1002, the first network node store, in a location registry associated with the UE, a list of a plurality of top of service function chain (SFC) nodes, where each top of SFC node is a first node in a SFC that is in communication with a second network node. In step 1004, the first network node forwards, in response to receiving a request from the second network node, the list of the plurality of top of SFC nodes to the second network node. The second network node selects at least one top of SFC node from the plurality of top of SFC nodes in accordance with predetermined criteria.

In some embodiments, the predetermined criteria specifies selecting a top of SFC node that has the smallest traffic load. In some embodiments, the predetermined criteria specifies selecting a top of SFC node in accordance with a round-robin scheduling procedure. In some embodiments, the predetermined criteria specifies selecting a top of SFC node by applying a hash function on information included in a downlink data packet intended for the UE. In some embodiments, the hash function is applied to one or more fields included in a header of the downlink data packet. In some embodiments, the predetermined criteria specifies selecting a top of SFC node that is nearest to the second network node. In some embodiments, the first network node is a control plane (CP) node and the second network node is an Internet Advertisement Point (IAP) node. In some embodiments, the process further includes the first network node transmitting the predetermined criteria to the second node. In some embodiments, the selected top of SFC node is a user plane function (UPF) node. In some embodiments, the selected top of SFC node is a classifier (CL) node. In some embodiments, the second network node forwards the downlink data packet to a forwarding element (FE) that forwards the data packet to the selected top of SFC node. In some embodiments, the second network node forwards the downlink data packet to an Internet Engineering Task Force (IETF) service function forwarder (SFF) that forwards the data packet to the selected top of SFC node.

Figure 11:
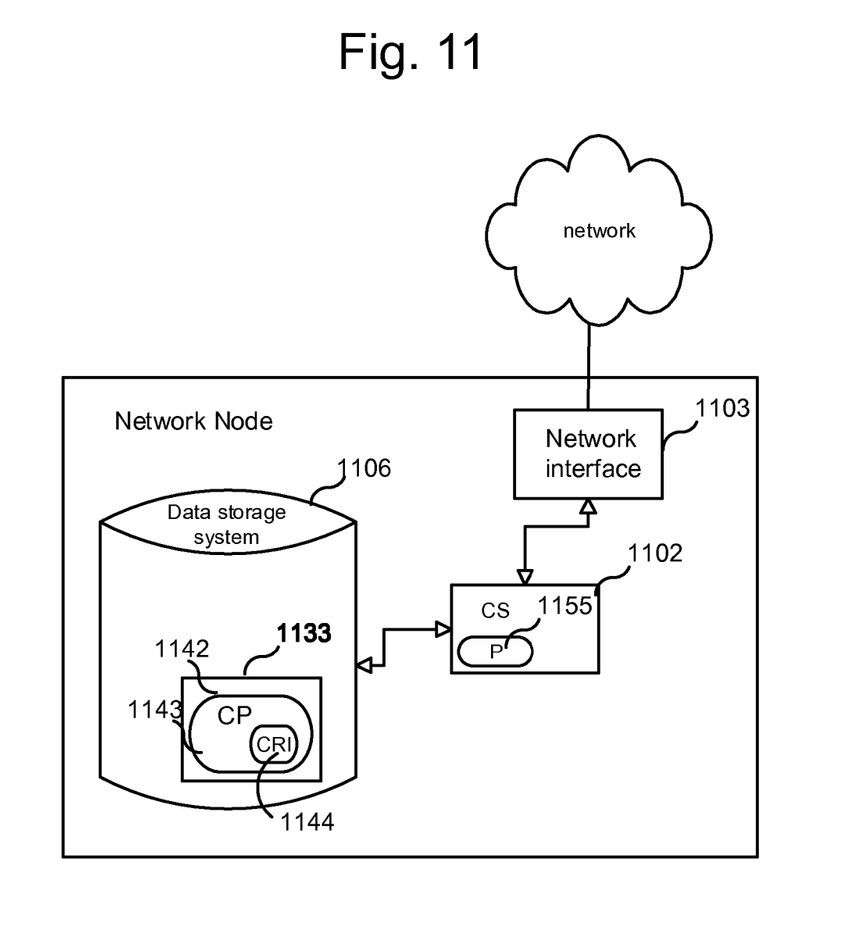
FIG. 11 illustrates a network node in accordance with exemplary embodiments.

FIG. 11 is a block diagram of an embodiment of network node such as a MME/SGW/PGW/HSS. As shown in FIG. 11, the network node may include or consist of: a computer system (CS) 1102, which may include one or more processors 1155 (e.g., a general purpose microprocessor) and/or one or more circuits, such as an application specific integrated circuit (ASIC), field-programmable gate arrays (FPGAs), a logic circuit, and the like; a network interface 1103 for use in connecting the network node to a network; and a data storage system 1106, which may include one or more non-volatile storage devices and/or one or more volatile storage devices (e.g., random access memory (RAM)). In embodiments where the network node includes a processor 1155, a computer program product (CPP) 1133 may be provided. CPP 1133 includes or is a computer readable medium (CRM) 1142 storing a computer program (CP) 1143 comprising computer readable instructions (CRI) 1144. CRM 1142 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1144 of computer program 1143 is configured such that when executed by computer system 1102, the CRI causes the network node to perform steps described above (e.g., steps described above with reference to the flow charts and message flows shown in the drawings). In other embodiments, the network node may be configured to perform steps described herein without the need for a computer program. That is, for example, computer system 1102 may consist merely of one or more ASICs. Hence, the features of the embodiments described herein may be implemented in hardware and/or software.

Figure 12:
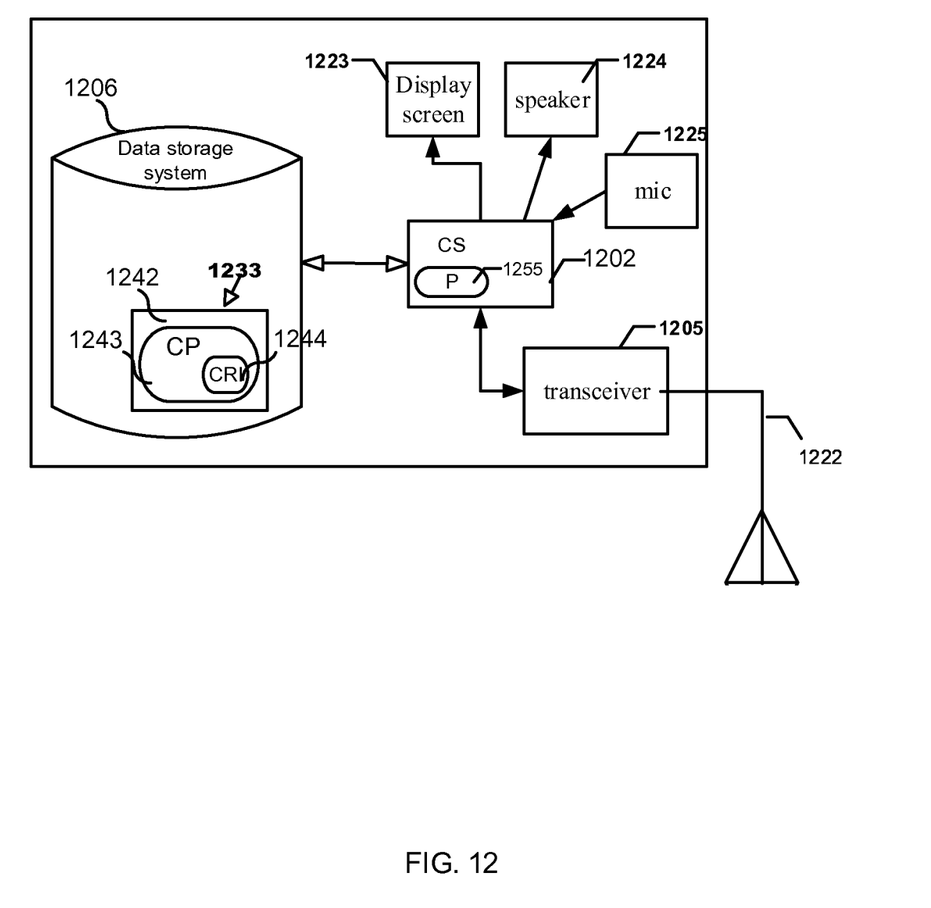
FIG. 12 illustrates a wireless communication device in accordance with exemplary embodiments.

FIG. 12 is a block diagram of UE according to some embodiments. As shown in FIG. 12, UE may include or consist of: a computer system (CS) 1202, which may include one or more processors 1255 (e.g., a general purpose microprocessor) and/or one or more circuits, such as an application specific integrated circuit (ASIC), field-programmable gate arrays (FPGAs), a logic circuit, and the like; a transceiver 1205, coupled to an antenna, 1222 for transmitting and receiving data wireless; and a data storage system 1206, which may include one or more non-volatile storage devices and/or one or more volatile storage devices (e.g., random access memory (RAM)). In embodiments where UE includes a processor 1255, a computer program product (CPP) 1233 may be provided. CPP 1233 includes or is a computer readable medium (CRM) 1242 storing a computer program (CP) 1243 comprising computer readable instructions (CRI) 1244. CRM 1242 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1244 of computer program 1243 is configured such that when executed by computer system 1202, the CRI causes the UE to perform steps described above (e.g., steps described above with reference to the flow charts and message flows shown in the drawings). In other embodiments, UE may be configured to perform steps described herein without the need for a computer program. That is, for example, computer system 1202 may consist merely of one or more ASICs. Hence, the features of the embodiments described herein may be implemented in hardware and/or software. As shown in FIG. 12, UE may include: a display screen 1233, a speaker 1224, and a microphone ("mica"), all of which are coupled to CS 1202.

According to some embodiments, the term entity may refer to a single network node or a network function distributed over a number of nodes. For example, a network control entity may be implemented on a single node or distributed over a plurality of nodes. In some embodiments, the term entity may refer to a software component running in a virtualized environment.

Although terminology from 3GPP has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM may also benefit from exploiting the ideas covered within this disclosure. Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

CL Classifier
CP Control Plane
FE Forwarding Element
IAP Internet Protocol Advertisement Point
LR Location Registry
UPF User Plane Function

The invention claimed is:

1. A method performed in a control plane node, the method comprising:
    the control plane node receiving a network attachment request associated with a UE, wherein the network attachment request is a request for attaching the UE to a network;
    as a result of the control plane node receiving the network attachment request, the control plane node storing, in a location registry associated with the UE, information identifying a set of N downlink (DL) top service function chain (SFC) nodes, wherein N is a positive integer greater than or equal to 2, each DL top SFC node is a first node in a SFC that is communicatively connected to an internet protocol advertisement point (IAP) that is separate from the control plane node, and the information identifying the N DL top SFC nodes comprises a first DL top SFC node identifier identifying a first DL top SFC node and a second DL top SFC node identifier identifying a second DL top SFC node; and
    in response to the control plane node receiving a request from the IAP, the control plane node sending to the IAP a message identifying said N DL top SFC nodes, wherein the message comprises the first DL top SFC node identifier and the second DL top SFC node identifier, wherein
    the IAP is configured to transmit the request in response to receiving a downlink data packet,
    the IAP is configured to select one of said N top SFC nodes identified by the message in accordance with a predetermined criteria, and
    the IAP is a user plane node configured to advertise towards an IP network (i) a range of IP addresses and/or (ii) a range of IP prefixes.

2. The method according to claim 1, wherein the predetermined criteria specifies selecting from the N top SFC nodes a top SFC node that has the smallest traffic load.

3. The method according to claim 1, wherein the predetermined criteria specifies selecting a top SFC node in accordance with a round-robin scheduling procedure.

4. The method according to claim 1, wherein the predetermined criteria specifies selecting a top SFC node by applying a hash function on information included in a downlink data packet intended for the UE.

5. The method according to claim 4, wherein the hash function is applied to one or more fields included in a header of the downlink data packet.

6. The method according to claim 4, wherein the predetermined criteria specifies selecting from the N top SFC nodes a top SFC node that is nearest to the IAP.

7. The method according to claim 1, further comprising: transmitting the predetermined criteria to the IAP.

8. The method according to claim 1, wherein the selected top SFC node is a classifier (CL) node.

9. The method according to claim 1, wherein the location registry is a table of entries each of which maps an IP address or a prefix to a set of DL top SFC nodes.

10. The method according to claim 1, wherein the IAP forwards the downlink data packet to a forwarding element (FE) that forwards the data packet to the selected top SFC node.

11. The method according to claim 1, wherein the IAP forwards the downlink data packet to an Internet Engineering Task Force (IETF) service function forwarder (SFF) that forwards the data packet to the selected top SFC node.

12. The method of claim 1, wherein the message does not identify any SFC node that is not a first node in any SFC.

* * * * *